June 27, 1967  F. H. GUBER, JR., ET AL  3,327,456

HIGH TEMPERATURE CYCLONE

Filed April 30, 1964  3 Sheets-Sheet 1

Fred H. Guber, Jr.
Robert S. Kleppe  INVENTORS

BY George J. Silbury

PATENT ATTORNEY

June 27, 1967
F. H. GUBER, JR., ET AL
3,327,456
HIGH TEMPERATURE CYCLONE
Filed April 30, 1964
3 Sheets-Sheet 2
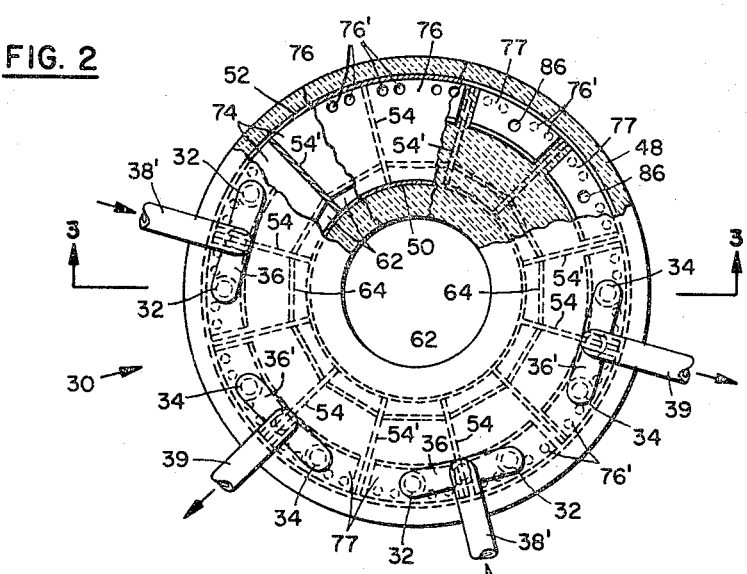
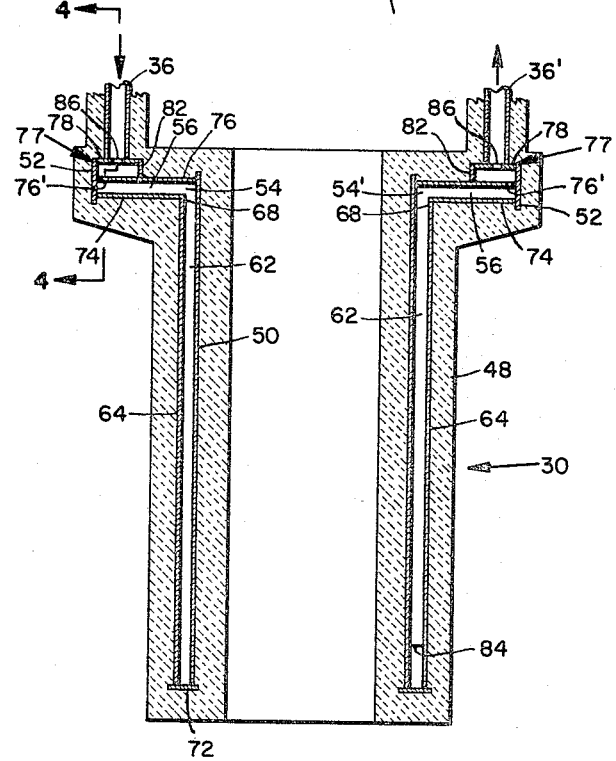
Fred H. Guber, Jr.
Robert S. Kleppe
INVENTORS
BY George J. Hilary
PATENT ATTORNEY Fred H. Guber, Jr.
Robert S. Kleppe
INVENTORS

United States Patent Office 3,327,456
Patented June 27, 1967

3,327,456
HIGH TEMPERATURE CYCLONE
Fred H. Guber, Jr., Cranford, and Robert S. Kleppe, Summit, N.J., assignors to Esso Research and Engineering Company, a corporation of Delaware
Filed Apr. 30, 1964, Ser. No. 363,795
6 Claims. (Cl. 55—269)

This invention relates to cyclone separators and, more particularly, to cyclone separators for use in extremely high temperature operations.

It is extremely difficult to find a material for cyclone separators which will withstand a high temperature in the range between about 1500° and 3500° F. The material must be able to withstand thermal and mechanical shock and have abrasion resistance necessary at these high temperatures. The gaseous-solid high temperature mixture is introduced into the cyclone tangentially and is whirled with great velocity. The gas path takes the form of a double vortex. The gas spirals downwardly on the outside of the gas outlet pipe then passes up through the pipe and is subsequently removed at the top of the cyclone separator. Solids are thrown with great centrifugal force to the wall of the cyclone separator and are subsequently removed from the bottom of the cyclone separator.

Conventional cyclones have a gas outlet pipe which extends into the barrel of the cyclone to an elevation slightly below the inlet line. For high temperature service, this pipe must be deleted or fabricated of a refractory. Available refractories such as alumina, magnesia, beryllia, silicon carbide and carbon do not produce satisfactory results since stresses due to thermal gradients and differential thermal expansion causes the refractory to disintegrate or crumble. Deletion of the pipe results in a large decrease in cyclone efficiency.

According to the present invention, an improved cyclone separator design is provided. The invention comprises a hollow, refractory coated cyclone outlet pipe which extends down into the barrel of the cyclone. This pipe is manufactured from a high alloy steel such as a steel which contains 25% Cr and 20% Ni. The external surface is coated with castable refractory or bricks to reduce heat losses and protect the alloy tube from erosion and excessive temperatures.

The tubular extension is hollow and is divided into sections by longitudinal baffles certain of which stop short of the bottom of the tubular extension and thereby provide a number of parallel vertical passes or paths through which a heat exchange fluid such as a coolant may be passed. Flow of the heat exchange fluid or coolant is generally axial and the coolant flows down for the full length of one of the vertical paths of the tubular extension and back up through an adjacent vertical path to exit at the same end of the tubular extension at which it entered. The number of parallel passes or paths for the coolant can be varied to maintain a satisfactory temperature level for the metallic components of the tubular extension and yet minimize heat loss from the process. Steam is utilized as the preferred coolant but other coolants are also satisfactory. All inlet lines can be connected to a common source and all outlet lines can be connected to a common outlet.

In the drawings:

FIGURE 2 represents an enlarged top plan view of the cyclone tube extension, with parts broken away to facilitate the disclosure.

FIGURE 3 represents an enlarged vertical longitudinal section of the extension tube taken on line 3—3 of FIGURE 2.

Figure 1:
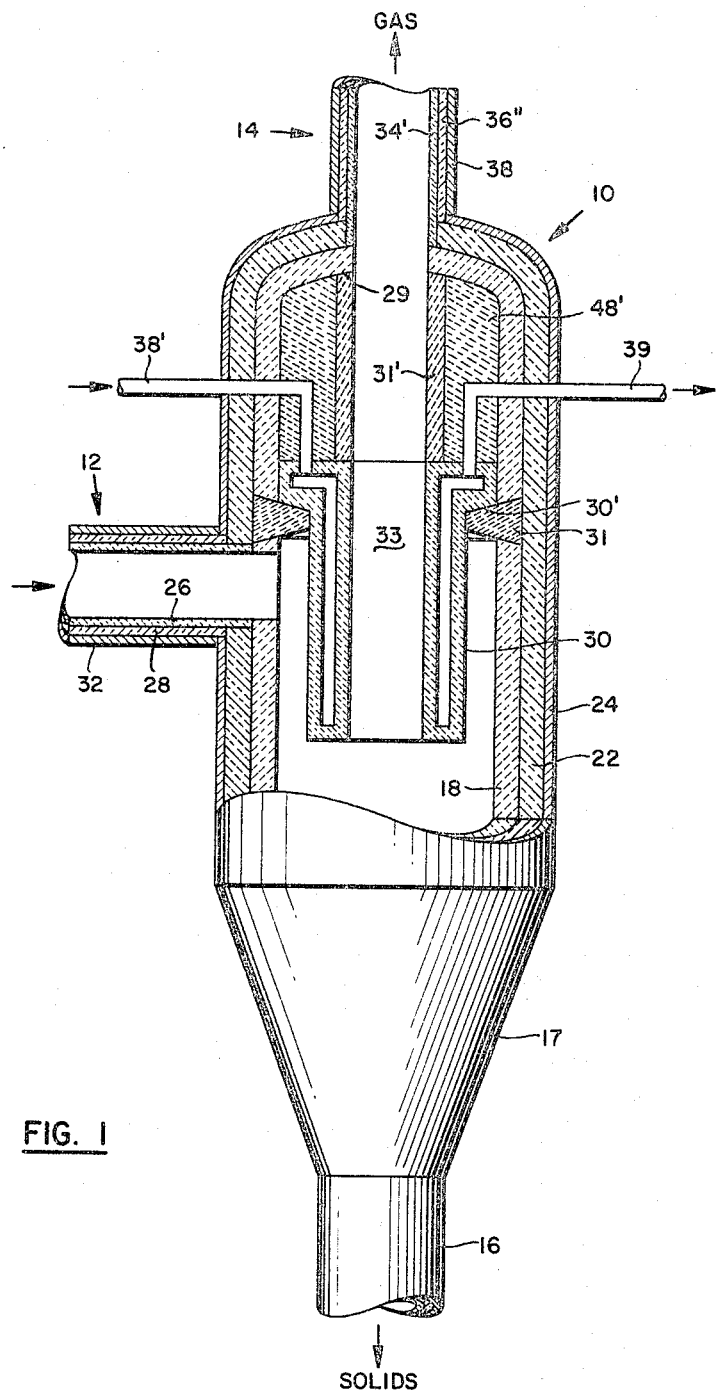
FIGURE 1 represents a vertical longitudinal section of a cyclone separator embodying features of the present invention and showing the extension tube diagrammatically.

Referring now to the drawings, in FIGURE 1, the reference character 10 designates a cyclone separator having a gas-solids inlet 12 and a top gas outlet 14. A solids outlet 16 is provided leading from the bottom region 17 of the cyclone separator 10. The cyclone separator of the present invention is intended and has been developed for use in separating hot solids from hot gaseous suspensions of solids having a temperature from about 1500° to about 3500° F. The cyclone separator housing 10 includes a dense refractory material interior wall 18, a surrounding heat insulation refractory material 22 and an outer metal shell 24 such as steel.

The interior wall 18 may be made from high purity alumina, castable refractory or brick or other high temperature materials such as silicon carbide and chrome castable. The heat insulation refractory 22 may be made from a light weight alumina-silica castable refractory or the like. The inlet 12 for the gas-solids suspension has an inner refractory tube 26 similar to the interior 18 and a heat insulating refractory tube or surrounding layer 28 similar to refractory 22 and an external metal shell 32. The gas outlet 14, likewise, has an inner refractory tube 34', a surrounding heat insulating refractory tube or material 36" and an external metal shell 38.

The lower portion of the cyclone separator 10 at 17 is funnel shaped in the conventional manner to deliver separated solids to the solids outlet 16. The main body of the cyclone separator 10 is circular in horizontal cross section as in conventional cyclone separators. The gas-solids inlet 12 opens tangentially into the interior of the wall 18 in order to give the entering suspension a rotary motion.

Within the main body of the cyclone is mounted cyclone extension tube 30 having a beveled lip or shoulder 30' which is supported by a beveled circular refractory support 31 embedded in wall 18 and projecting from wall 18 into the interior of the cyclone separator 10. Tube 30 is fabricated from metal and refractory material such as alumina or magnesia. Metals which can be used include 25% chrome, 20% nickel and iron or 18% chrome, 8% nickel and iron. In use the cooled hollow metallic tube 30 provides strength and hence structural support while the refractory coating protects the metallic components and reduces heat losses in the process. The combination of cooled metal and refractory renders the assembly heat and erosion resistant. This is of particular importance since this cyclone is especially adapted for use in reactions or operations where temperatures above 1500° F. are to be used.

As mentioned previously, cyclone extension tube 30 is subjected to high temperatures and, in the past, has been a constant source of breakdown within the cyclone separator. To prevent this, the apparatus of the instant invention is provided with passageways for a coolant to be circulated within the cyclone tube extension 30. The preferred coolant is steam but other suitable fluids may be utilized, such as hydrocarbon gases.

The extension tube 30 forms an extension of refractory tube 31' which is arranged between the top of tube 30 and the inner top wall 29 of the cyclone separator housing 10. The outlet for gases from the cyclone separator is formed as a continuous vertical cylindrical passageway 33 through extension tube 30, refractory tube 31' and outlet 14 in vertical alignment. A plurality of sets of inlets and outlets for cooling gas are arranged adjacent each other and alternate circumferentially around tube 30. This feature will subsequently be described in greater detail.

Coolant fluid enters cyclone 10 through inlet line 38' and it leaves through an outlet line 39. The upper region of the cyclone surrounding inlet line 38' and outlet line 39 is packed with refractory 48'. Reractory 48' is used primarily to eliminate voids and because of this may be light weight and may have low strength properties.

Figure 4:
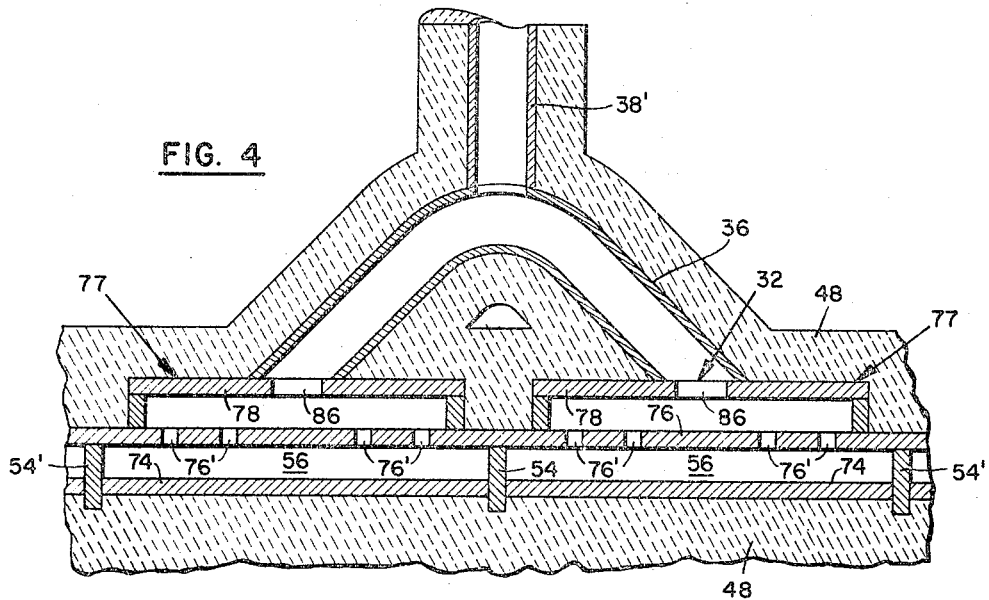
FIGURE 4 represents an enlarged detail of one common inlet for adjacent paths in the cyclone tube extension.

Referring now to FIGURES 2, 3 and 4 which show the circular arrangement of the inlets and outlets and show the hollow construction of the extension tube 30, there are shown pairs of inlets 32 arranged adjacent each other and pairs of outlets 34 arranged adjacent each other. The pairs of inlets 32 and pairs of outlets 34 alternate around the tube 30. In the specific design shown there are three pairs of inlets 32 and three pairs of outlets 34 arranged around the periphery of the tube 30. As shown in FIGURES 2 and 4, there is a curved common duct or pipe 36 for connecting a pair of inlets 32 and a curved common duct or pipe 36' for connecting a pair of outlets 34. There is a single line 38' connected to each common duct or pipe 36 so that with the inlets 32 the line 38' forms an inlet line for cooling fluid for one pair of adjacent inlets 32 and another separate line 39 forms an outlet line for a pair of adjacent outlets 34. All the common inlet lines are connected externally to one manifold and all the outlet ducts are connected to one manifold (not shown). As diagrammatically shown in FIGURE 1, there is an inlet line or pipe 38' and an outlet line or pipe 39.

The cyclone tube 30 shown in FIGURE 3 is provided with a refractory covering 48 which provides protection for the tube 30 from the 1500° to 3500° F. temperature to which it is exposed.

Referring again to FIGURES 2 and 3, the cyclone extension tube 30 includes a central elongated metal cylinder 50 which forms the inner metallic wall of the tube 30. On the outer periphery of the tube 30 is another cylinder 52 which is concentric with cylinder 50 but which is shallow or short. Cylinder 52 forms the outer boundary of the metallic portion of tube 30 and extends to a higher level than the top of inner cylinder 50.

Between and separating each inlet 32 and each outlet 34 is an inverted L-shaped baffle 54' whose upper end forms part of trapezoidal upper or top chamber 56 presently to be described in greater detail.

Arranged between each set of baffles 54 and 54' is a flat elongated vertical plate member 64 which is spaced outwardly from inner cylinder 50 and substantially parallel thereto and which extends from one baffle 54 to the next adjacent baffle 54. The vertical edges of each plate member 64 are in sealed engagement, as by welding, with the adjacent baffles 54 to form a vertical elongated space 62. Each vertical plate member 64 is shorter than the inner cylinder 50 so that its upper end 68 is at a lower level than the upper end of inner cylinder 50. The bottom end of cylinder 50 and the bottom ends of plate members 64 rest on and are sealed by annular plate member 72.

In each section between the baffles 54 at the upper end of tube 30 is a horizontally extending substantially trapezoidal plate member 74 which is arranged between the bottom portion of cylinder 52 and each plate member 64. Baffles 54 are welded in place. Inner end of plate member 74 rests on top of plate member 64. Arranged above the plane of trapezoidal plate member 74 and in spaced relation thereto is an annular plate 76 arranged between the inner face of short cylinder 52 and the outer face of inner cylinder 50 to form the cover for trapezoidal chamber 56 hereinbefore mentioned. Each trapezoidal plate member 74 is welded in place.

Annular plate member 76 is provided adjacent its periphery with sets of outer holes or openings 76'. These openings, four in number, provide one set of openings for each chamber 56. The holes or openings are arranged on the arc of a circle concentric with cylinder 52. These holes are sized to obtain satisfactory distribution of the cooling fluid in adjacent passages or chambers 56. The number of holes 76' can be varied as desired. Arranged on top of the annular plate 76 are boxes 77 arranged in a circle and each box has its top wall 78 flush with and abutting the top of small or short cylinder 52. There is a box 77 for each compartment 56. Each box 77 is generally trapezoidal in shape and is shorter in length than the width of chamber 56 and much narrower than plate 76. Each box 77 is arranged above one set of four openings 76'. Each box 77 has a side 82 which is parallel to cylinder 50 and rests on plate 76. The top wall 78 of each box 77 has a central opening 86 for conducting fluid into the box 77 from which the fluid is distributed to a trapezoidal chamber 56 and from there to spaces 62 between inner cylinder 50 and plate members 64. Opening 86 is out of alignment with holes 76'. Each opening 86 is larger than any of the openings 76'. Communicating with box 77 is the inlet pipe 38'. Each inlet line 38' and each outlet line 39 communicates with a box 77. Adjacent inlets have a connecting pipe 36. Adjacent outlets have a connecting pipe 36'.

Figure 5:
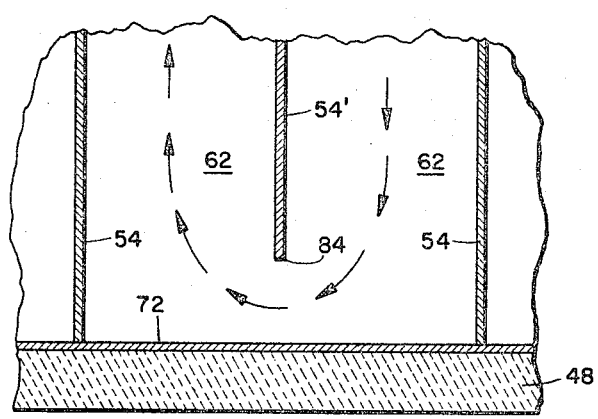
FIGURE 5 represents an enlarged detail section of one of the baffles which stops short of the tubular extension bottom.

Each baffle member 54' arranged between an inlet 32 and and outlet 34 does not extend to the bottom of passage way 62 but reaches short of the bottom as shown at 84 in FIGURE 5 and this permits fluid introduced into an inlet to flow down the entire length of inner cylindrical tube 50 and space 62, under the bottom 84 of baffle 54' and up through adjacent passageway to the adjacent outlet 34 and outlet box 77. The baffles which are shorter are indicated as 54' whereas those that extend the whole distance to the bottom plate 72 are indicated as 54.

In a specific embodiment of this invention, cyclone separator 10 had a gas inlet 12 of about 5 inches in diameter and solids outlet area 16 which was about 9½ inches in diameter.

The inner wall 18 and refractory support ring 31 were constructed of a castable high-purity alumina. The packing 48' was refractory such as alumina. The length of the cyclone separator from the top of solids outlet 16 to inner wall 18 at the topmost part of the separator 10 was about 9.6 feet. The cyclone tube 30 was about 33 inches in length and about 18 inches in diameter at its lower end and about 26.5 inches in diameter at its flared upper end. Each inlet tube 38' and outlet tube 39 was one inch pipe. Tube 30 and lines 38' and 39, which are respectively inlet and outlet tubes, were composed of the same alloy. The alloy consisted of 25% chromium, 20% nickel and steel (Type 310). Outlet line 39 was substantially similar in dimension and composition to inlet line 38'.

The internal diameter of cyclone 10 was about 27.5 inches. Inner refractory layer 18 was about 3 inches in thickness. Inner layer 22 was about 4 inches in thickness and outer layer or shell 24 was about ⅜-inch in thickness.

Turning now to FIGURE 2, inlets 32 and outlets 34 were each one inch in diameter. Tube 36 connecting pairs of inlets and 36' connecting outlets were about 10 inches in length and had about 45° curvature. This is also illustrated in FIGURE 4. Baffle 54 seen in FIGURES 2 and 3 was about 29 inches in length. Openings 76' were about ¼ of an inch in diameter. Openings 86 were about 1 inch in diameter. Box 77 was about 2 inches in width and about 5 inches in length and about 1 inch in height. Each chamber 56 was about 6 inches in width, 6 inches in length and about 1 inch in height. Tube or cylinder 50 was about 30 inches in length and had a diameter of about 13 inches. Each plate member 64 had a height of about 29 inches and a width of about 3.5 inches. Space 62 was about ¾-inch in width. The refractory 48 which forms the outer layer of tube 30 was about 1½ inches in thickness.

In FIGURE 5 the distance from the bottom 84 of baffle 54' to the bottom of tube 30 was about 2½ inches. As mentioned above, FIGURE 5 illustrates the fact that the baffle does not form a complete wall between adjacent inlets and outlets.

The cyclone separator of the present invention was used to separate coke from hot combustion gases. The process from which the hot combustion gases and coke was obtained was a high temperature cracking operation.

About 260 actual cubic feet per minute of combustion gas with about 0.05 lbs./cubic ft. of solid suspended coke particles were introduced at a temperature of about 2400° F. into cyclone separator 10 into inlet 12. The gaseous solid high temperature mixture was introduced into the cyclone as a cylindrical helix and was whirled with great velocity. The gas path took the form of a double vortex. The gas spiraled downwardly on the outside and then proceeded upwardly on the inside of the cyclone and subsequently the gas was removed from the top region of the cyclone separator through outlet 14. The gas traveled up through passageway 33 past tube 31' and finally out through outlet 14. The separated solids moved down into lower region 17 of cyclone 10 and were subsequently removed through solids outlet line 16. About 99% of the solid material was recovered through solids outlet 16.

At about the same time as the introduction as the gaseous-solids mixture into the cyclone separator, a coolant, which was in this case steam, was introduced into the passageways of the inner cyclone extension tube 30 in the cyclone. The coolant was introduced into lines 38' and passed into lines 36 and finally into inlets 32. The coolant was then directed down through passage 62 for the entire length of cylinder 50, proceeded around the bottom 84 of baffle 54' and came up through the adjacent passageway 62 through an opening 76' to the outlet chamber 56, then through box 77 and from there into outlets 34, lines 36' and then into lines 39 from whence it was removed from the system. About 450 lbs./hr. of coolant were utilized, the coolant was introduced into the system at a temperature of about 300° F. When the coolant was removed from the system it was at a temperature of about 850° F. metallic portions of tube 30 were maintained at a temperature of about 1300° to 1400° F. while the coolant was circulated through the system.

The cyclone separator 10 was operated for a period of about 1150 hours at an average temperature over 2000° F. During this time tube 30 did not deteriorate to any noticeable degree, nor was there any instance of the tube 30 cracking. By contrast, conventional or ordinary solid cyclone tubes as a rule crack or deteriorate within about 150 hours.

Although the invention has been described with some particularity, it is intended to be limited only by the following claims.

What we claim is:

1. An apparatus adapted for separating gases and solids at high temperatures which includes a housing provided with a refractory-lined inner wall and refractory-lined inlet and outlet lines, a tube in said housing forming the lower portion of said outlet line to form a passageway for conducting gas to said outlet line, said tube being provided with sets of passageways extending longitudinally of said tube and arranged circumferentially around said tube, each set of passageways having an inlet portion and an outlet portion, the inlet portions of the sets being adjacent and the outlet portions of the sets being adjacent, tubular means communicating with adjacent inlet portions to conduct fluid to said inlet portions and passageways, other tubular means communicating with adjacent outlet portions to remove fluid from said passageways and outlet portions, the inlet portion and outlet portion of each respective set of passageways being adjacent one another.

2. An apparatus adapted for separating gases and solids at high temperatures which includes a housing provided with inlet and outlet lines for gas, a hollow-walled tube in said housing forming the lower portion of said outlet line to form a passageway for conducting gas to said outlet line, said tube being provided with spaced baffles to form sets of passageways extending longitudinally of said tube and arranged in a circle around said tube, each set of passageways having an inlet portion and an outlet portion, alternate baffles extending to the bottom of said tube and the rest of the baffles being shorter so as to end short of the bottom of said tube, said shorter baffles being positioned between an inlet portion and outlet portion of each set of passageways, the inlet portions of the sets being adjacent and the outlet portions of the sets being adjacent, tubular means communicating with adjacent inlet portions to conduct fluid to said inlet portions, other tubular means communicating with adjacent outlet portions to remove fluid from said outlet portions, the inlet portion and outlet portion of each respective set of passageways being adjacent one another.

3. A cyclone separator adapted for separating gases and solids at high temperatures which includes a housing provided with a refractory-line inner wall and refractory-lined inlet and outlet lines for gas, a tube in said housing forming the lower portion of said outlet line to form a passageway for conducting gas to said outlet line, said tube being provided with a plurality of enclosed chambers in its top portion, each of said chambers being provided with a plurality of orifices in its top wall, a rectangular box for each enclosed chamber positioned over said orifices, each of said rectangular boxes being in sealed relation with the tops of the respective chambers, an additional orifice arranged in the top of each of the said boxes whereby cooling gas may pass freely between the said chamber and the said box, a tubular member within said tube and integral with said box and positioned so that cooling gas passing through the said orifice will pass into the said tubular member, said tubular member being provided with spaced baffles therein to form sets of passageways extending longitudinally of said tubular member and arranged in a circle around said tube, each set of passageways having an inlet portion and an outlet portion, alternate ones of said baffles extending to the bottom of said tubular member and the rest of the baffles being shorter so as to extend short of the bottom of said tubular member, said shorter baffles being positioned between an inlet portion and outlet portion of each set of passageways, the inlet portions of the sets being adjacent and the outlet portions of the sets being adjacent, conduit means communicating with adjacent inlet portions to conduct cooling gas to said inlet portions and other conduit means communicating with adjacent outlet portions to remove cooling gas from said outlet portions, the inlet portion and outlet portion of each respective set of passageways being adjacent one another.

4. An apparatus adapted for separating gases and solids at high temperatures which includes a housing provided with a refractory-lined inner wall and a refractory-lined inlet and outlet lines, a tube in said housing forming the lower portion of said outlet line to form a passageway for conducting gas to said outlet line, said tube being provided with sets of passageways extending longitudinally of said tube and arranged circumferentially around said tube, a plurality of baffles within said tube, alternate baffles extending to the bottom of said tube and the rest of the baffles being shorter so as to extend short of the bottom of the tube, each set of passageways having an inlet portion and an outlet portion, the inlet portions of each set being adjacent and the outlet portions of each set being adjacent, whereby fluid conducted to each inlet portion passes down a passageway and under the shorter baffle and up through the adjacent passageway and out from the outlet portion, the inlet portion and outlet portion of each respective set of passageways being adjacent one another.

5. An apparatus adapted for separating gases and solids at high temperatures which includes a housing provided with a refractory-lined inner wall and refractory-lined inlet and outlet lines for gas, a tube in said housing forming the lower portion of said outlet line to form a passageway for conducting gas to said outlet line, said tube being provided with a plurality of enclosed chambers in its top portion, each of said chambers being provided with a plurality of orifices, a plurality of rectangular boxes, each box containing an orifice and integrally connected on top of its respective chamber, the said orifices being arranged beneath the said box whereby cooling gas may pass freely between each of said chambers and its respective box, a tubular member associated with said box and positioned so that cooling gas passing through the said orifice will pass into the said tubular member, said tubular member being provided with sets of passageways extending longitudinally of said tube and arranged circumferentially around said tube, each set of passageways having an inlet portion and an outlet portion, the inlet portions of each set being adjacent and the outlet portions of each set being adjacent, whereby cooling gas conducted to each inlet portion passes down a passageway and up through the adjacent passageway and out from the outlet portion, the inlet portion and outlet portion of each respective set of passageways being adjacent one another.

6. The apparatus of claim 5 where the said tube is a refractory material.

References Cited

UNITED STATES PATENTS

| | | | |
|---|---|---|---|
| 1,844,369 | 2/1932 | Ross | 55—412 X |
| 2,441,833 | 5/1948 | Morrison | 165—169 X |
| 3,070,990 | 1/1963 | Krinov | 55—268 X |

FOREIGN PATENTS

| | | |
|---|---|---|
| 861,495 | 1/1953 | Germany. |
| 641,357 | 8/1950 | Great Britain. |
| 762,070 | 11/1956 | Great Britain. |
| 91,286 | 3/1958 | Norway. |

HARRY B. THORNTON, *Primary Examiner.*

ROBERT F. BURNETT, D. E. TALBERT, JR.,
*Assistant Examiners.*